(12) United States Patent
Zhu et al.

(10) Patent No.: US 9,343,135 B2
(45) Date of Patent: May 17, 2016

(54) PHYSICALLY UNCLONABLE FUNCTION BASED ON PROGRAMMING VOLTAGE OF MAGNETORESISTIVE RANDOM-ACCESS MEMORY

(71) Applicant: QUALCOMM Incorporated, San Diego, CA (US)

(72) Inventors: Xiaochun Zhu, San Diego, CA (US); Steven M. Millendorf, San Diego, CA (US); Xu Guo, San Diego, CA (US); David M. Jacobson, San Diego, CA (US); Kangho Lee, San Diego, CA (US); Seung H. Kang, San Diego, CA (US); Matthew Michael Nowak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/072,537

(22) Filed: Nov. 5, 2013

(65) Prior Publication Data

US 2015/0070979 A1 Mar. 12, 2015

Related U.S. Application Data

(60) Provisional application No. 61/875,566, filed on Sep. 9, 2013.

(51) Int. Cl.
*G11C 11/16* (2006.01)
*G09C 1/00* (2006.01)
(Continued)

(52) U.S. Cl.
CPC .............. *G11C 11/1695* (2013.01); *G09C 1/00* (2013.01); *G11C 11/161* (2013.01); *G11C 11/1673* (2013.01); *G11C 11/1675* (2013.01); *H04L 9/0866* (2013.01); *H04L 9/3278* (2013.01); *H04L 2209/12* (2013.01)

(58) Field of Classification Search
None
See application file for complete search history.

(56) References Cited

U.S. PATENT DOCUMENTS

| 2009/0249014 A1* | 10/2009 | Obereiner et al. ............ 711/164 |
| 2012/0106235 A1 | 5/2012 | Christensen et al. |
| 2012/0206167 A1 | 8/2012 | Ong et al. |

(Continued)

FOREIGN PATENT DOCUMENTS

| WO | 2004114122 A2 | 12/2004 |
| WO | WO-2009024913 A2 | 2/2009 |

OTHER PUBLICATIONS

International Search Report and Written Opinion—PCT/US2014/054073—ISA/EPO—Nov. 26, 2014.

*Primary Examiner* — James G Norman
(74) *Attorney, Agent, or Firm* — Loza & Loza, LLP (57) ABSTRACT

One feature pertains to a method of implementing a physically unclonable function. The method includes initializing an array of magnetoresistive random-access memory (MRAM) cells to a first logical state, where each of the MRAM cells have a random transition voltage that is greater than a first voltage and less than a second voltage. The transition voltage represents a voltage level that causes the MRAM cells to transition from the first logical state to a second logical state. The method further includes applying a programming signal voltage to each of the MRAM cells of the array to cause at least a portion of the MRAM cells of the array to randomly change state from the first logical state to the second logical state, where the programming signal voltage is greater than the first voltage and less than the second voltage.

17 Claims, 8 Drawing Sheets

(51) Int. Cl.
*H04L 9/08* (2006.01)
*H04L 9/32* (2006.01)

(56) References Cited

U.S. PATENT DOCUMENTS

2013/0141137 A1 6/2013 Krutzik et al.
2013/0147511 A1* 6/2013 Koeberl .................. H03K 19/23
　　　　　　　　　　　　　　　　　　　　　　326/8
2013/0194886 A1 8/2013 Schrijen et al.
2013/0208526 A1 8/2013 Chung
2014/0126306 A1* 5/2014 Otterstedt ................ G11C 7/06
　　　　　　　　　　　　　　　　　　　　　　365/189.07

* cited by examiner

Initialized Array

FIG. 7

$V_1 < V_{PS} < V_2$ Applied

PHYSICALLY UNCLONABLE FUNCTION BASED ON PROGRAMMING VOLTAGE OF MAGNETORESISTIVE RANDOM-ACCESS MEMORY

CLAIM OF PRIORITY

The present application for patent claims priority to U.S. Provisional Patent Application No. 61/875,566 entitled "PHYSICALLY UNCLONABLE FUNCTION BASED ON PROGRAMMING VOLTAGE OF MAGNETORESISTIVE RANDOM-ACCESS MEMORY" filed Sep. 9, 2013, the entire disclosure of which is hereby expressly incorporated by reference herein.

BACKGROUND

1. Field

Various features relate to physically unclonable functions (PUFs), and in particular to PUFs based on the programming voltages of an array of magnetoresistive random-access memory (MRAM) cells.

2. Background

An on-chip PUF is a chip-unique challenge-response mechanism exploiting manufacturing process variations inside integrated circuits (ICs). When a physical stimulus (i.e., challenge) is applied to the PUF, the PUF generates a response in an unpredictable but repeatable way due to the complex interaction of the stimulus with the physical microstructure of the device employing the PUF. This exact microstructure depends on physical factors introduced during manufacture of the device employing the PUF, which are unpredictable. The PUF's "unclonability" means that each device employing the PUF has a unique and unpredictable way of mapping challenges to responses, even if one device is manufactured with the same process as another seemingly identical device. Thus, it is practically infeasible to construct a PUF with the same challenge—response behavior as another device's PUF because exact control over the manufacturing process is infeasible.

Figure 1:
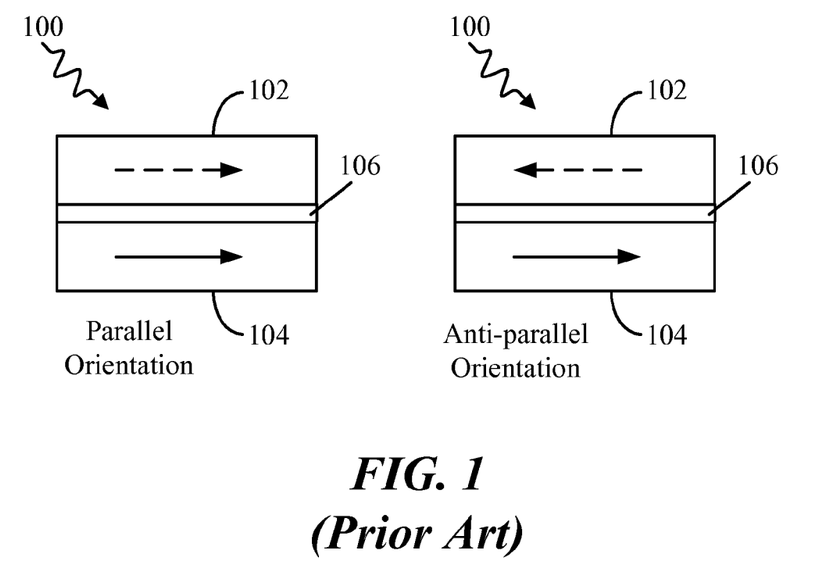
FIG. 1 illustrates a simplified schematic diagram of the magnetic storage elements that form part of an MRAM circuit cell found in the prior art.

MRAM is a non-volatile random-access memory that, unlike conventional RAM, stores data not as electric charge but instead as electron spin within magnetic storage elements. FIG. 1 illustrates a simplified schematic diagram of the magnetic storage elements 100 that form part of an MRAM circuit cell found in the prior art. Referring to FIG. 1, the magnetic storage elements 100 include a first ferromagnetic layer 102 and a second ferromagnetic layer 104 that are separated by a very thin insulating layer 106. The magnetic layers 102, 104 each hold a magnetic field with a specific direction of polarity. The second magnetic layer 104, also known as a "pinned reference layer," may be a permanent magnet with a magnetic polarity that is fixed (as shown by the solid arrow). The magnetic polarity of the first magnetic layer 102, also known as a "free layer," is not fixed and may be changed by an external magnetic field (not shown). For example, as indicated by the dashed arrows the magnetic polarity of the first magnetic layer 102 may be oriented either parallel or antiparallel to the magnetic polarity of the second magnetic layer 104. The thin insulating layer 106 is made of a very thin insulating material that separates the two magnetic layers 102, 104. The thin insulating layer 106 is also known as a "tunneling layer" in that it is so thin that electrons can flow (i.e., tunnel) through its thickness between the two magnetic layers 102, 104 despite the tunneling layer 106 being an insulator.

If the polarity of the first magnetic layer 102 is oriented such that it is parallel to the second magnetic layer 104, then the resistance between the layers 102, 104 is relatively low (i.e., low resistance state). Such a state may be considered to represent a data bit "0" state (logical state "0"). By contrast, if the polarity of the first magnetic layer 102 is oriented such that it is anti-parallel to the second magnetic layer 104, then the resistance between the layers 102, 104 is relatively high (i.e., high resistance state). Such a state may be considered to represent a data bit "1" state (logical state "1").

Figure 2:
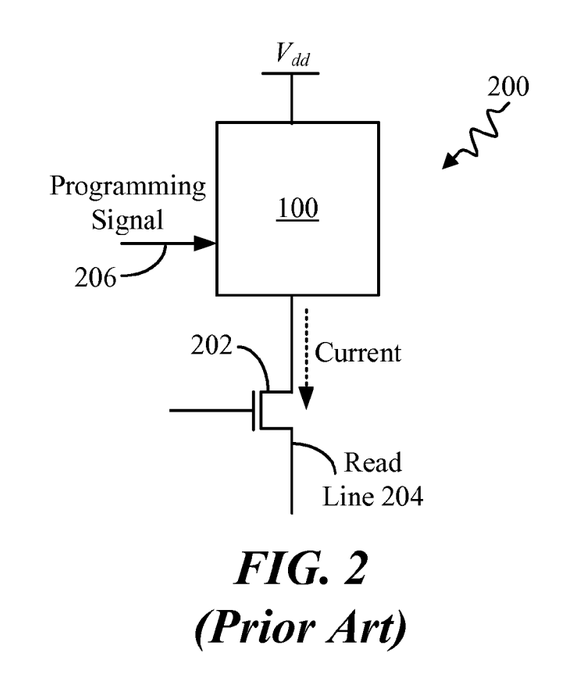
FIG. 2 illustrates an MRAM circuit cell found in the prior art.

FIG. 2 illustrates an MRAM circuit cell 200 found in the prior art. A transistor 202 coupled to the magnetic storage elements 100 controls the flow of current through the storage elements 100. If the transistor 202 is turned ON current flows through the magnetic storage elements 100 as indicated by the downward dashed arrow. Depending on the resistance state (i.e., logical state) of the magnetic storage elements 100, the current flow will either be relatively high or relatively low. Thus, data may be read from the MRAM circuit cell 200 by turning on the transistor 202 and measuring the current flow through the read line 204. A relatively high current flow means the resistance state of the magnetic storage elements is low and thus a "0" bit is stored. A relatively low current flow means the resistance state of the magnetic storage elements is high and thus a "1" bit is stored.

Referring to FIGS. 1 and 2, data may be written to the cell 200 (i.e., the logical state may be changed) by changing the polarity of the first magnetic layer 102. A programming signal 206 (e.g., a write-line signal) supplies a voltage/current to the magnetic storage elements 100 that causes the polarity of the first magnetic layer 102 to change direction, and thus the data bit stored changes from a "0" to a "1" or a "1" to a "0." The programming signal's 206 voltage (herein also referred to as "programming signal voltage $V_{PS}$") must exceed the transition voltage $V_T$ of the magnetic storage elements 100 in order for the data bit transition to occur.

There exists a need for methods and apparatuses that implement PUFs based on MRAM cells. Such MRAM based PUFs may provide a secure means to uniquely identify electronic devices, such as integrated circuits, and/or provide secure cryptographic keys for cryptographic security algorithms.

SUMMARY

One feature provides a method of implementing a physically unclonable function (PUF). The method comprises initializing an array of magnetoresistive random-access memory (MRAM) cells to a first logical state, where each of the MRAM cells have a random transition voltage $V_T$ that is greater than a first voltage $V_1$ and less than a second voltage $V_2$, the transition voltage $V_T$ representing a voltage level that causes the MRAM cells to transition from the first logical state to a second logical state, and applying a programming signal voltage $V_{PS}$ to each of the MRAM cells of the array to cause at least a portion of the MRAM cells of the array to randomly change state from the first logical state to the second logical state, where the programming signal voltage $V_{PS}$ is greater than the first voltage $V_1$ and less than the second voltage $V_2$. According to one aspect, the method further comprises sending a challenge to the MRAM cell array that reads logical states of select MRAM cells of the array, and obtaining a response to the challenge from the MRAM cell array that includes the logical states of the selected MRAM cells of the array. According to another aspect, the programming signal voltage $V_{PS}$ is about equal to a third voltage $V_3$ that corresponds to a voltage level that causes about half of the MRAM cells to change logical state from the first logical state to the second logical state.

According to one aspect, the logical states of the MRAM cells of the array after the programming signal voltage $V_{PS}$ is applied are stored in secure memory. According to another aspect, the logical states of the MRAM cells of the array after the programming signal voltage $V_{PS}$ is applied serve as a cryptographic key that uniquely identifies an electronic device. According to yet another aspect, the second voltage $V_2$ is less than a breakdown voltage of any one of the MRAM cells of the array, where the breakdown voltage is that voltage at which a tunneling insulator layer of the MRAM cells breaks down.

According to one aspect, the challenge includes MRAM cell address information, and the response includes data bit information of MRAM cells corresponding to the MRAM cell address information. According to another aspect, the logical states of the MRAM cells of the array after the programming signal voltage $V_{PS}$ is applied are utilized by a cryptographic security algorithm. According to yet another aspect, the first voltage $V_1$ is less than the transition voltage $V_T$ of each MRAM cell of the MRAM cell array, and the second voltage $V_2$ is greater than the transition voltage $V_T$ of each MRAM cell of the MRAM cell array.

Another feature provides an apparatus for implementing a physically unclonable function (PUF). The apparatus comprises an array of magnetoresistive random-access memory (MRAM) cells each having a random transition voltage $V_T$ that is greater than a first voltage $V_1$ and less than a second voltage $V_2$, where the transition voltage $V_T$ represents a voltage level that causes the MRAM cells to transition from a first logical state to a second logical state, and a processing circuit communicatively coupled to the array, where the processing circuit is configured to initialize the array of MRAM cells to the first logical state, and apply a programming signal voltage $V_{PS}$ to each of the MRAM cells of the array to cause at least a portion of the MRAM cells of the array to randomly change state from the first logical state to the second logical state, the programming signal voltage $V_{PS}$ greater than the first voltage $V_1$ and less than the second voltage $V_2$. According to one aspect, the processing circuit is further configured to send a challenge to the MRAM cell array that reads logical states of select MRAM cells of the array, and obtain a response to the challenge from the MRAM cell array that includes the logical states of the selected MRAM cells of the array.

Another feature provides an apparatus for implementing a physically unclonable function (PUF) where the apparatus comprises a means for initializing an array of magnetoresistive random-access memory (MRAM) cells to a first logical state, each of the MRAM cells having a random transition voltage $V_T$ that is greater than a voltage $V_1$ and less than a voltage $V_2$, the transition voltage $V_T$ representing a voltage level that causes the MRAM cells to transition from the first logical state to a second logical state, and means for applying a programming signal voltage $V_{PS}$ to each of the MRAM cells of the array to cause at least a portion of the MRAM cells of the array to randomly change state from the first logical state to the second logical state, the programming signal voltage $V_{PS}$ greater than the first voltage $V_1$ and less than the second voltage $V_2$. According to one aspect, the apparatus further comprises a means for sending a challenge to the MRAM cell array that reads logical states of select MRAM cells of the array, and a means for obtaining a response to the challenge from the MRAM cell array that includes the logical states of the selected MRAM cells of the array.

Another feature provides a computer-readable storage medium having instructions stored thereon for implementing a physically unclonable function (PUF), the instructions, which when executed by at least one processor, causes the processor to initialize an array of magnetoresistive random-access memory (MRAM) cells to a first logical state, each of the MRAM cells having a random transition voltage $V_T$ that is greater than a first voltage $V_1$ and less than a second voltage $V_2$, the transition voltage $V_T$ representing a voltage level that causes the MRAM cells to transition from the first logical state to a second logical state, and apply a programming signal voltage $V_{PS}$ to each of the MRAM cells of the array to cause at least a portion of the MRAM cells of the array to randomly change state from the first logical state to the second logical state, the programming signal voltage $V_{PS}$ greater than the first voltage $V_1$ and less than the second voltage $V_2$. According to one aspect, the instructions further cause the processor to send a challenge to the MRAM cell array that reads logical states of select MRAM cells of the array, and obtain a response to the challenge from the MRAM cell array that includes the logical states of the selected MRAM cells of the array.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation.

Overview

Methods and apparatuses are described herein that implement PUFs based on MRAM circuit cell arrays. Specifically, the unique and random transition voltage of individual MRAM circuit cells of an MRAM array is utilized as the basis for implementing and executing a PUF. The responses generated by the MRAM based PUF may be used to uniquely identify the electronic device, such as an integrated circuit, having the MRAM based PUF. Alternatively, the responses generated by the PUF may be used as secure cryptographic keys for cryptographic security algorithms.

Exemplary MRAM Based PUF and Methods for Implementing the Same

As described above, in order to program a specific MRAM cell (i.e., change the bit value) the programming signal voltage applied to that specific MRAM cell must exceed the transition voltage $V_T$ of that cell. Notably, even though an array of MRAM cells have been manufactured to be identical, the transition voltages $V_T$ of each MRAM cell in the array will not be exactly the same. Random variations during the manufacturing process of MRAM circuit cells (e.g., varying semiconductor device dimensions, doping concentrations, irregularities, etc.) cause the transition voltages $V_T$ of the cells to vary, even if only slightly. For example, an array of MRAM circuit cells may include one MRAM circuit cell that has a transition voltage $V_T$ that may be as low as 0.302 volts whereas another MRAM circuit cell in the same array may have a transition voltage $V_T$ that is as high as 0.509 volts. The remaining plurality of cells within the array will have transition voltages $V_T$ that lie within this range. Moreover, the specific transition voltage $V_T$ of any one particular MRAM circuit cell is virtually impossible to predict and is random in nature due to these random manufacturing variations. As described herein, the random transition voltages $V_T$ of an array of MRAM circuit cells may be used as a basis to implement a PUF.

Figure 3:
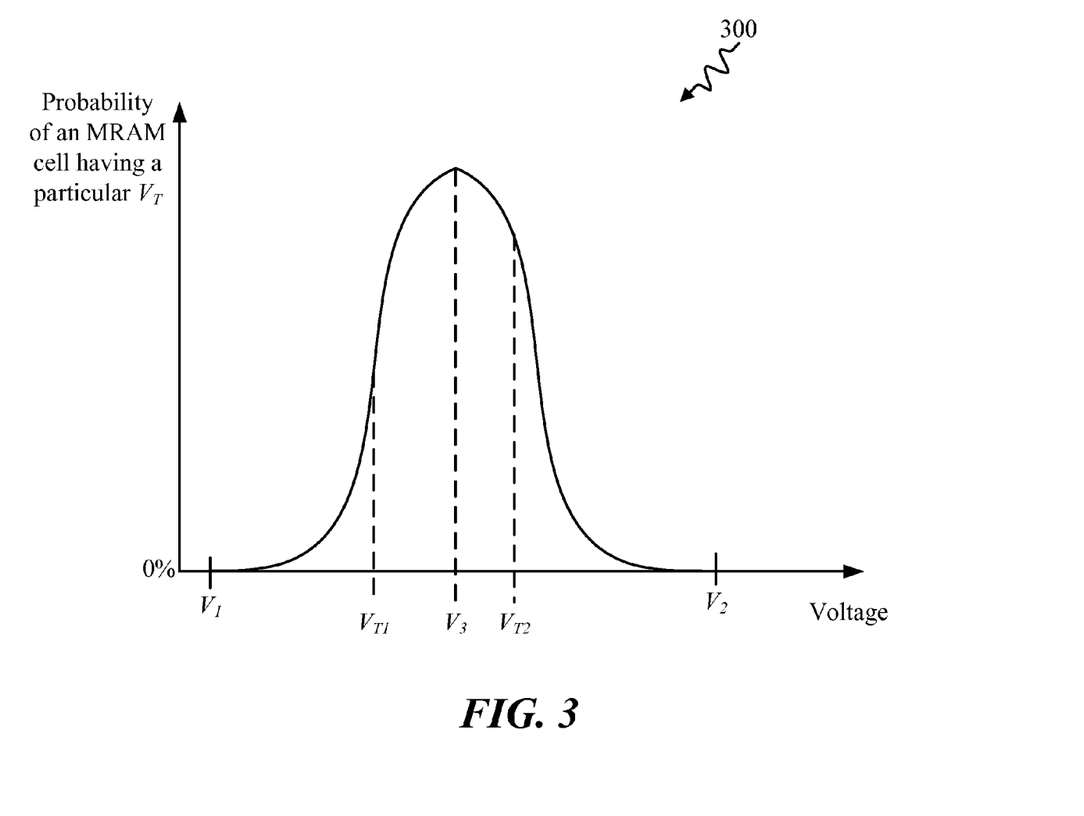
FIG. 3 illustrates a graph of the probability distribution of an MRAM circuit cell having a transition voltage $V_T$ that is equal to a particular voltage value.

FIG. 3 illustrates a graph 300 of the probability distribution of an MRAM circuit cell having a transition voltage $V_T$ that is equal to a particular voltage value according to one aspect of the disclosure. The voltage level marker $V_1$ (herein also referred to as "first voltage") represents a voltage level that is less than the transition voltage $V_T$ of all of the MRAM cells within the array. Thus, with a very high degree of probability (e.g., greater than 99.99%) all of the MRAM cells in the array will likely have a transition voltage $V_T$ that is greater than $V_1$, and hence applying a programming signal voltage equal to or less than the voltage $V_1$ to the array's MRAM cells will cause none of the MRAM cells to transition logical states. By contrast, the voltage level marker $V_2$ (herein also referred to as "second voltage") represents a voltage level that is greater than the transition voltage $V_T$ of all of the MRAM cells within the array. Thus, with a high degree of probability (e.g., greater than 99.99%) applying a programming signal voltage equal to or greater than the voltage level $V_2$ to any MRAM cell within the array will likely cause the MRAM cells to transition their logical states (e.g., "1" to "0" or "0" to "1"). The voltage level marker $V_3$ (hereinafter referred to as "third voltage") represents the voltage level where about half of the MRAM cells within the array have transition voltages $V_T$ that are equal to or less than the voltage level $V_3$. According to one example, the voltage $V_2$ is less than a breakdown voltage of any one of the MRAM cells of the array, the breakdown voltage being that voltage at which a tunneling insulator layer of the MRAM cells breaks down.

As one example, the graph 300 shows a transition voltage $V_{T1}$ that represents the transition voltage of a first MRAM cell within the MRAM cell array. In this case, the transition voltage $V_{T1}$ is less than the voltage $V_3$ yet greater than the array's minimum transition voltage $V_1$. Thus, applying a programming signal voltage $V_{PS}$ equal to or greater than the voltage $V_{T1}$ will cause the first MRAM cell to transition its logical state.

As another example, the graph 300 shows a transition voltage $V_{T2}$ that represents the transition voltage of a second MRAM cell within the MRAM cell array. In this case, the transition voltage $V_{T2}$ is greater than the voltage $V_3$ yet less than the array's greatest transition voltage $V_2$. Thus, applying a programming signal voltage $V_{PS}$ equal to or greater than the voltage $V_{T2}$ will cause the second MRAM cell to transition its logical state.

It may be observed that applying a programming signal having the voltage $V_{T1}$ to the second MRAM cell will not cause the second MRAM cell to transition logical states since the voltage $V_{T1}$ is less than the required transition voltage $V_{T2}$ of the second MRAM cell. By contrast, applying a programming signal having the voltage $V_{T2}$ to the first MRAM cell will cause the first MRAM cell to transition logical states since the voltage $V_{T2}$ is greater than its required programming voltage $V_{T1}$.

Notably, applying a programming signal voltage $V_{PS}$ less than $V_2$ to an MRAM cell within the array does not guarantee that that particular MRAM cell will change state, since in theory it may have a transition voltage $V_T$ that exceeds the programming signal voltage applied. Thus, applying a programming signal voltage $V_{PS}$ greater than $V_1$ yet less than $V_2$ to all of the MRAM cells in the array will cause—at random—some MRAM cells to transition logical states and other MRAM cells to not transition logical states.

Figure 4:
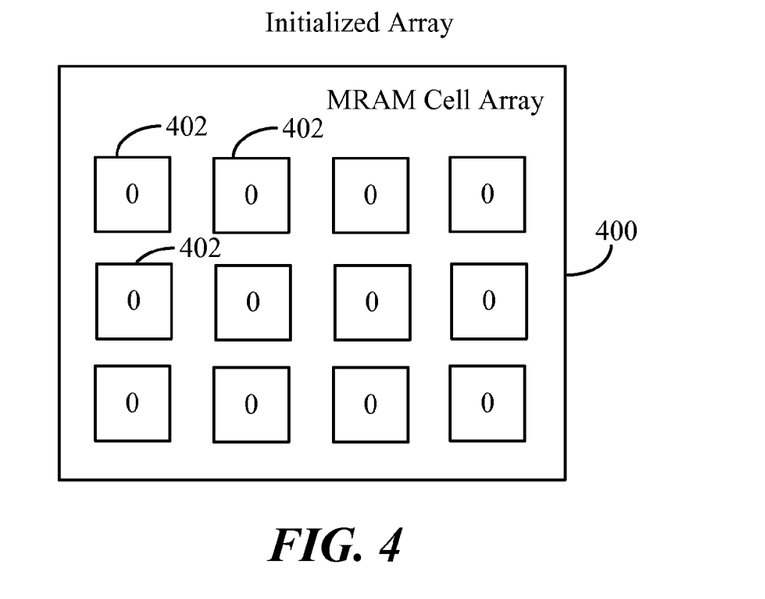
FIG. 4 illustrates an array of MRAM cells that have been initialized to a first logical state "0."
Figure 5:
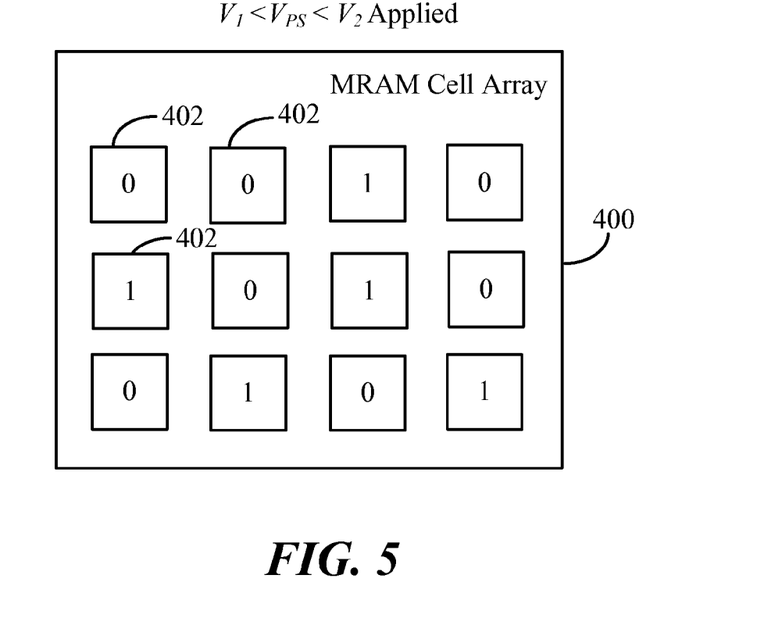
FIG. 5 illustrates the array of MRAM cells after a programming signal voltage $V_{PS}$ has been applied.

FIGS. 4 and 5 illustrate an array 400 of MRAM cells 402 according to one aspect of the disclosure. Specifically, FIG. 4 illustrates a case where the array 400 has been initialized such that all of the MRAM cells 402 in the array 400 have all been placed in a first logical state (e.g., the "0" logical state). FIG. 5 illustrates the same array 400 after a programming signal voltage $V_{PS}$ has been applied to all the MRAM cells in the array 400, where the voltage $V_{PS}$ is greater than the $V_1$ voltage value yet less than the $V_2$ voltage value shown in FIG. 3. For example, the $V_{PS}$ applied may equal to the $V_3$ voltage value. Consequently a portion, but not all, of the cells 402 in the array 400 will transition logical states from a "0" to a "1." Since the specific transition voltage $V_T$ values of the individual MRAM cells 402 are random in nature, it is impossible to predict which specific MRAM cells 402 will change logical state. The resulting logical state values of the array's MRAM cells 402 represent a random outcome that is unique to that particular MRAM cell array for the programming signal voltage $V_{PS}$ applied. For example, even if the same programming signal voltage $V_{PS}$ is applied to another MRAM cell array that was manufactured to be the same as the array 400 depicted in FIG. 4, the resulting logical state values of the other MRAM cell array will be different since each MRAM cell in the arrays have random and unique transition voltages $V_T$ that differ from one array to another. Thus, while an MRAM circuit cell having a cell address location X transitions logical states at a specific programming signal voltage $V_{PS}$, another MRAM circuit cell having the same cell address location on another, identical (i.e., manufactured to be the same) MRAM cell array may have a different transition voltage $V_T$ and thereby not transition logical states at the same programming signal voltage $V_{PS}$.

Figure 6:
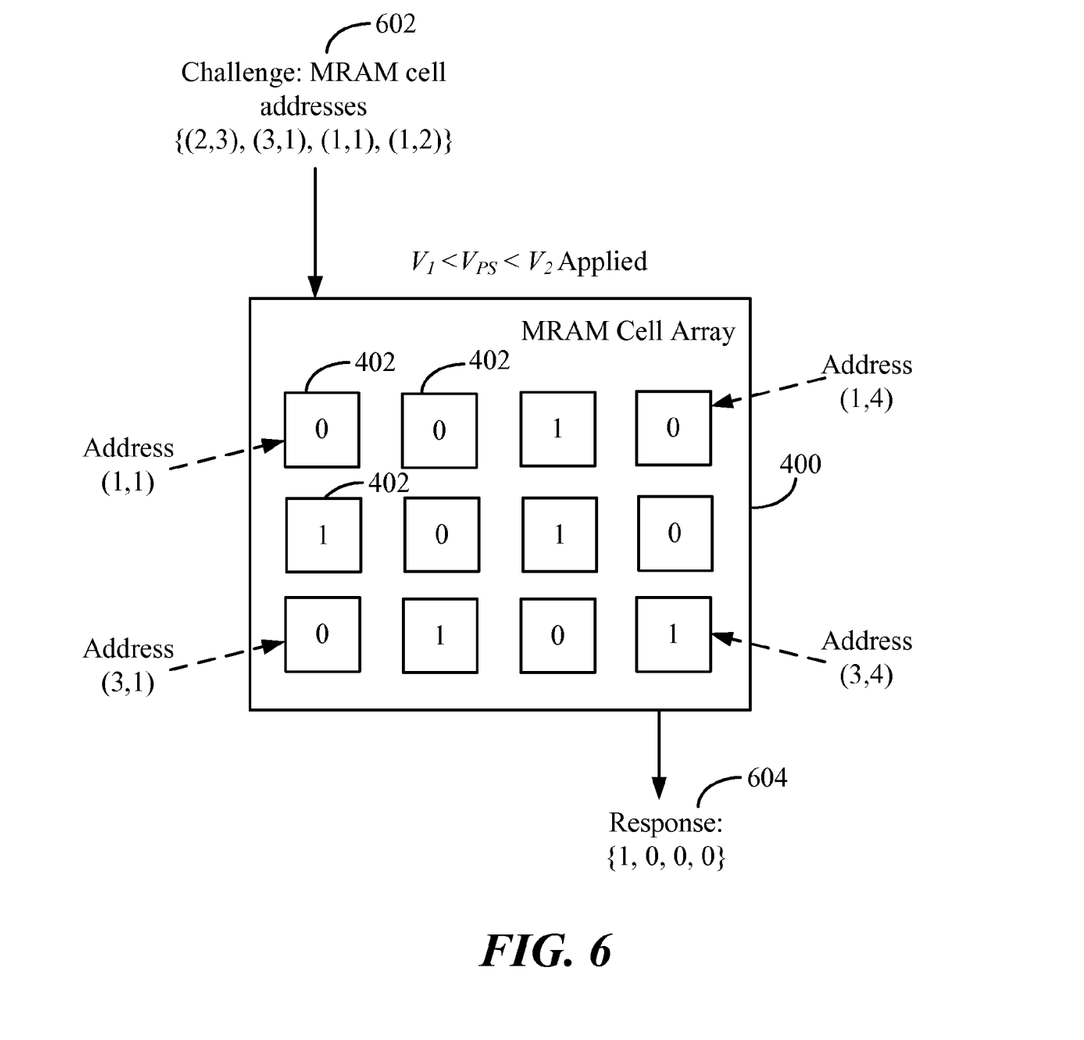
FIG. 6 illustrates an exemplary challenge-response system using the MRAM based PUF.

FIG. 6 illustrates an exemplary challenge-response system using the MRAM based PUF according to one aspect. A challenge may be received at the MRAM based PUF that includes MRAM cell address information. That is, the challenge may specify which MRAM cell address locations are to be read. In the illustrated example, a challenge 602 specifies that address locations {(2,3), (3,1), (1,1), (1,2)} of the MRAM array 400 that are to be read. The MRAM array 400 has been supplied with a programming signal voltage $V_{PS}$ (where $V_1 < V_{PS} < V_2$) that transitions some of the cells' logical states from an initialized first logical state (e.g., "0") to a second logical state (e.g., "1"). In response 604 to the challenge, the logical states of the MRAM cell address locations are read/retrieved. The resulting logical states read from the MRAM cells 402 is the response 604 to the challenge 602 issued. The resulting logical states are unique in that other MRAM cell arrays, even if attempted to be manufactured identical, will vary in their logical state responses given the same challenges (i.e., same MRAM cell address location read requests) due to uncontrollable manufacturing variation.

As one example, the response 604 may be used as a cryptographic key that uniquely identifies an electronic device and/or the integrated circuit that houses the MRAM cell array 400. As another example, the response 604 may be used as a random, unique key in a cryptographic security algorithm, such as a private key in a public-private key encryption algorithm.

Figure 7:
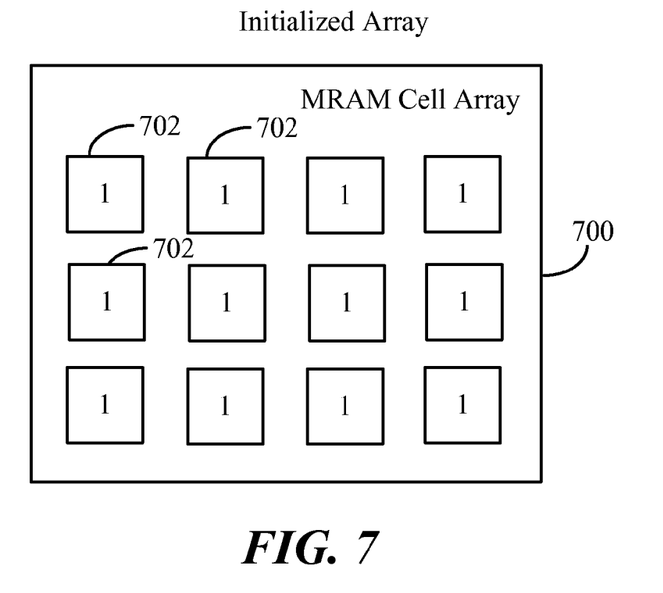
FIG. 7 illustrates an array of MRAM cells that have been initialized to a first logical state "1."
Figure 8:
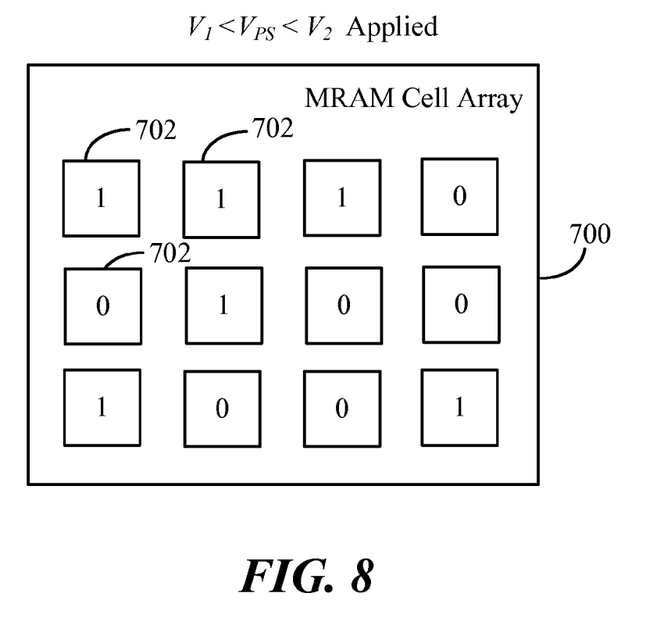
FIG. 8 illustrates the array of MRAM cells after a programming signal voltage $V_{PS}$ has been applied.

FIGS. 7 and 8 illustrate an array 700 of MRAM cells 702 according to one aspect of the disclosure. Specifically, FIG. 7 illustrates a case where the array 700 has been initialized such that all of the MRAM cells 702 in the array 700 have all been placed in a first logical state (e.g., the "1" logical state). FIG. 8 illustrates the same array 700 after a programming signal voltage $V_{PS}$ has been applied to all the MRAM cells in the array 700, where the voltage $V_{PS}$ is greater than the $V_1$ voltage value yet less than the $V_2$ voltage value shown in FIG. 3. For example, the $V_{PS}$ applied may equal to the $V_3$ voltage value.

Consequently a portion, but not all, of the cells 702 in the array 700 will transition logical states from a "1" to a "0." Since the specific transition voltage $V_T$ values of the individual MRAM cells 702 are random in nature, it is impossible to predict which specific MRAM cells 702 will change logical state. The resulting logical state values of the array's MRAM cells 702 represent a random outcome that is unique to that particular MRAM cell array for the programming signal voltage $V_{PS}$ applied.

Figure 9:
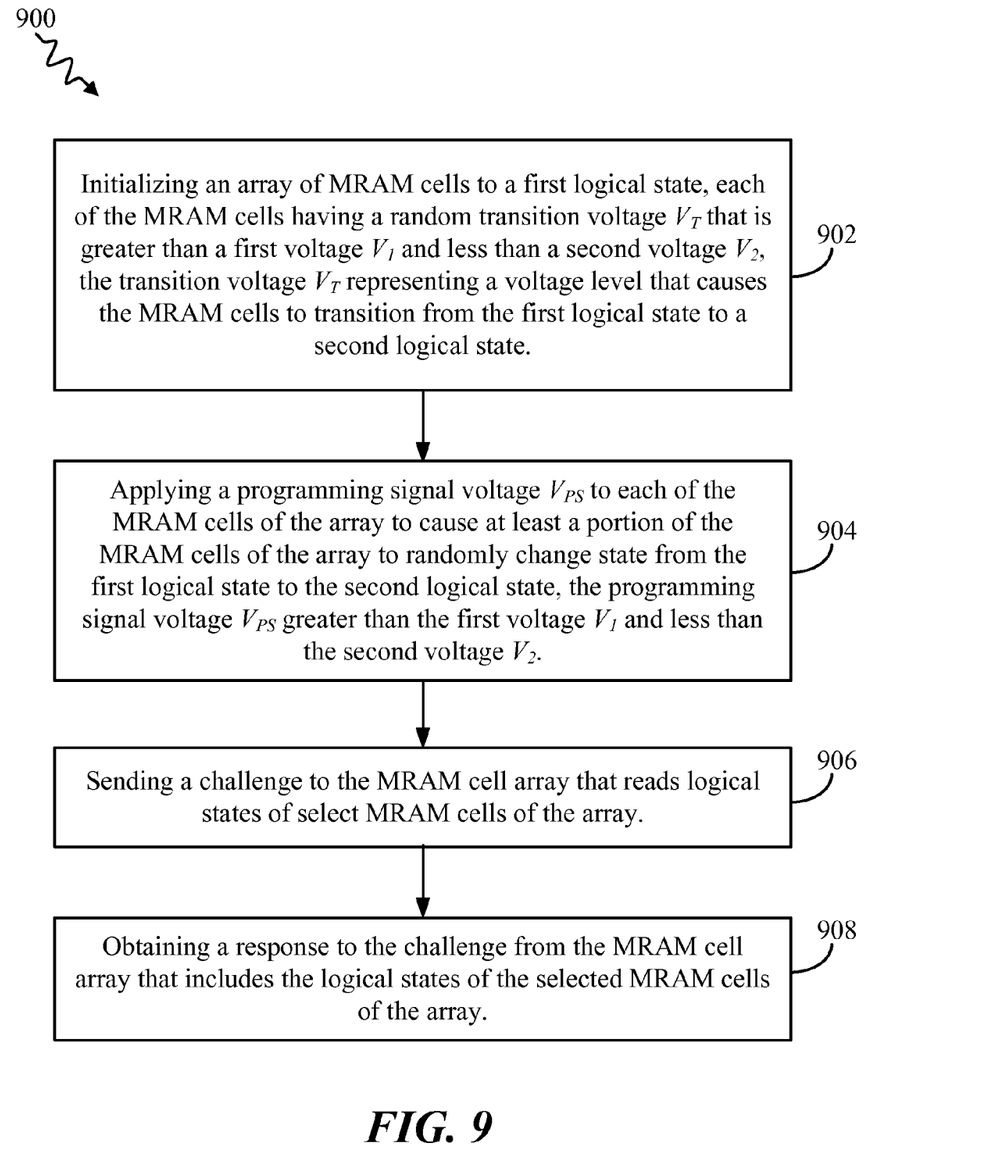
FIG. 9 illustrates a flow diagram of a method for implementing an MRAM based PUF.

FIG. 9 illustrates a flow diagram 900 of a method for implementing an MRAM based PUF according to one aspect. First, an array of MRAM cells are initialized to a first logical state, where each of the MRAM cells have a random transition voltage $V_T$ that is greater than a first voltage $V_1$ and less than a second voltage $V_2$ 902. The transition voltage $V_T$ represents a voltage level that causes the MRAM cells to transition from the first logical state to a second logical state. Next, a programming signal voltage $V_{PS}$ is applied to each of the MRAM cells of the array to cause at least a portion of the MRAM cells of the array to randomly change state from the first logical state to the second logical state, and where the programming signal voltage $V_{PS}$ is greater than the first voltage $V_1$ and less than the second voltage $V_2$ 904. Then, a challenge is sent to the MRAM cell array that reads logical states of select MRAM cells of the array 906. Next, a response to the challenge is obtained from the MRAM cell array that includes the logical states of the selected MRAM cells of the array 908.

Exemplary Electronic Device

Figure 10:
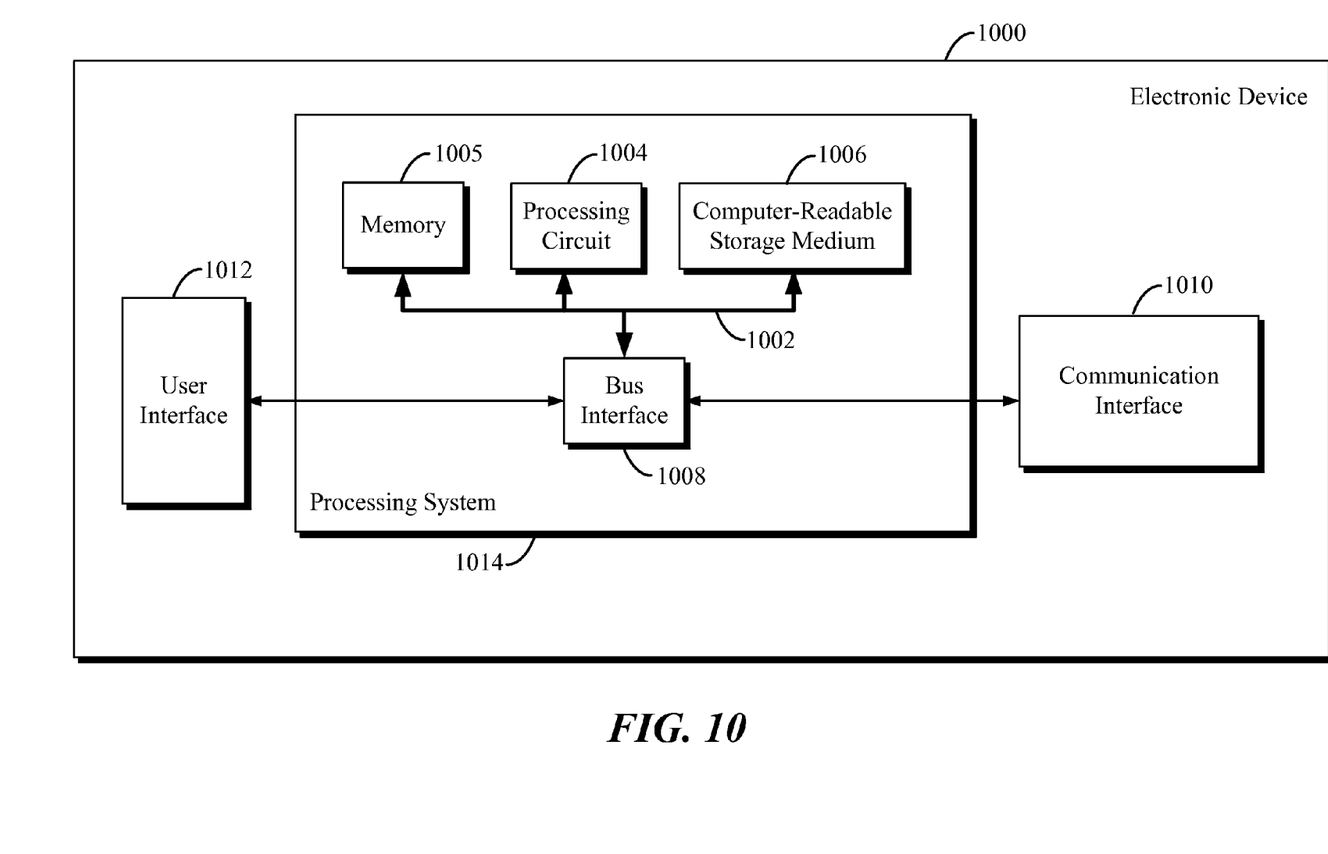
FIG. 10 illustrates an exemplary schematic block diagram of a hardware implementation for an electronic device that includes MRAM based PUFs.

FIG. 10 illustrates an exemplary schematic block diagram of a hardware implementation for an electronic device 1000 that may include the MRAM based PUFs described herein. The electronic device 1000 may be a mobile phone, smartphone, tablet, portable computer, and/or any other electronic device having circuitry. The electronic device 1000 may include a communication interface 1010, a user interface 1012, and a processing system 1014. The processing system 1014 may include a processing circuit (e.g., processor) 1004, a memory circuit (e.g., memory) 1005, a computer-readable storage medium 1006, a bus interface 1008, and a bus 1002. The processing system 1014 and/or the processing circuit 1004 may be configured to perform any of the steps, functions, and/or processes described above and also those steps depicted in FIG. 9.

The processing circuit 1004 may be one or more processors (e.g., first processor, etc.) that are adapted to process data for the electronic device 1000. For example, the processing circuit 1004 may be a specialized processor, such as an application specific integrated circuit (ASIC) that serves as a means for carrying out any one of the steps described in FIG. 9 and other figures described herein including FIGS. 3-8.

Examples of processing circuits 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing circuit 1004 is also responsible for managing the bus 1002, and executing software stored on the computer-readable storage medium 1006 and/or memory 1005. The software, when executed by the processing circuit 1004, causes the processing system 1014 to perform the various functions, steps, and/or processes described above with respect to FIG. 9 and other figures including FIGS. 3-8. The computer-readable storage medium 1006 may be used for storing data that is manipulated by the processing circuit 1004 when executing software.

The memory circuit 1005 may be non-volatile memory, such as but not limited to FLASH memory, magnetic or optical hard disk drives, etc. The memory circuit 1005 may include the MRAM arrays described herein that are used PUFs. For example, a portion of the memory circuit 1005 may be any one of the MRAM based PUFs depicted in FIGS. 4-8.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1006. The computer-readable storage medium 1006 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1006 may reside in the processing system

1014, external to the processing system 1014, or distributed across multiple entities including the processing system 1014. The computer-readable storage medium 1006 may be embodied in a computer program product.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 links together various circuits including one or more processors (represented generally by the processor 1004), a memory 1005, and computer-readable media (represented generally by the computer-readable storage medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and the communication interface 1010 (if present). The communication interface 1010 provides a means for communicating with other apparatus over a transmission medium. Depending upon the nature of the apparatus, a user interface 1012 (e.g., keypad, display, speaker, microphone, touch-screen display, etc.) may also be provided for the electronic device 1000.

Figure 11:
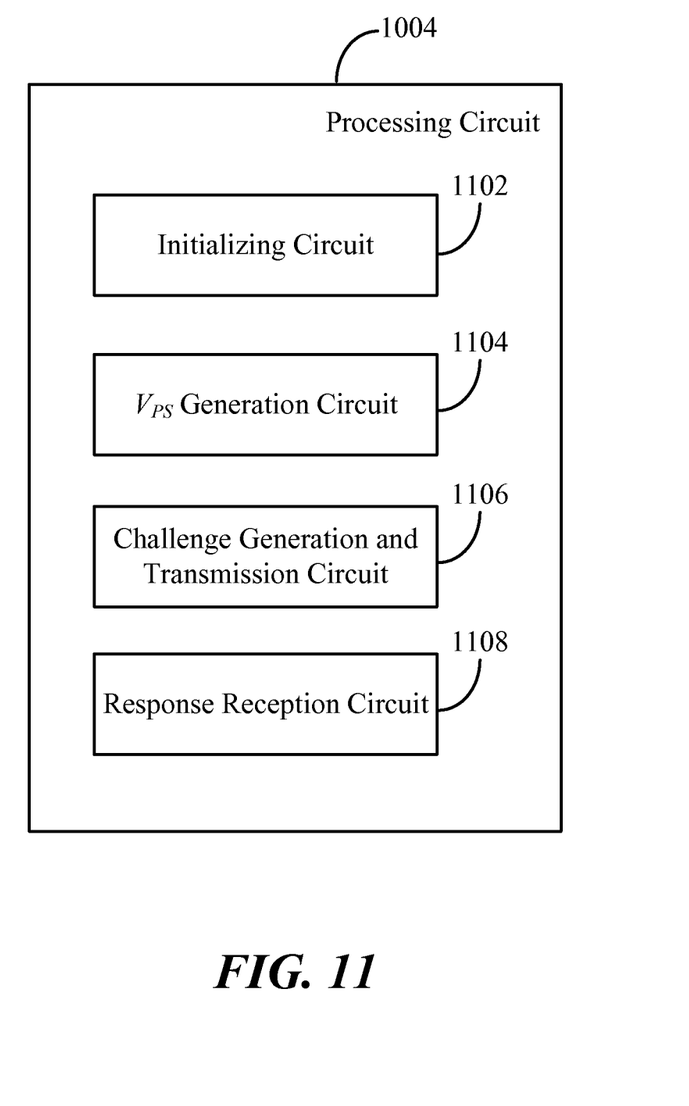
FIG. 11 illustrates a schematic block diagram of a processing circuit of the electronic device that includes MRAM based PUFs.

FIG. 11 illustrates a schematic block diagram of the processing circuit 1004 according to one aspect of the disclosure. The processing circuit 1004 may include an initializing circuit 1102, a programming signal voltage $V_{PS}$ generation circuit 1104, a challenge generation and transmission circuit 1106, and a response reception circuit 1108. According to one example, the circuits 1102, 1104, 1106, 1108 may be communicatively coupled to one another through, for example, a bus architecture or through direct electrical wire coupling.

The initializing circuit 1102 may be, according to at least one example, a hard wired ASIC that is capable of initializing an array of MRAM cells to a first logical state. As such, the initializing circuit 1102 represents at least one means for initializing an array of MRAM cells to a first logical state.

The programming signal voltage $V_{PS}$ generation circuit 1104 may be, according to one example, a hard wired ASIC that is capable of generating and/or applying a programming signal voltage $V_{PS}$ to each of the MRAM cells of the array to cause at least a portion of the MRAM cells of the array to randomly change state from the first logical state to the second logical state. Thus, the programming signal voltage $V_{PS}$ generation circuit 1104 represents at least one means for applying a programming signal voltage $V_{PS}$ to each of the MRAM cells of the array to cause at least a portion of the MRAM cells of the array to randomly change state from the first logical state to the second logical state.

The challenge generation and transmission circuit 1106 may be, according to one example, a hard wired ASIC that is capable of generating and sending a challenge to an MRAM cell array that reads logical states of select MRAM cells of the array. Thus, the challenge generation and transmission circuit 1106 represents at least one example of a means for generating and sending a challenge to an MRAM cell array that reads logical states of select MRAM cells of the array.

The response reception circuit 1108 may be, according to one example, a hard wired ASIC that is capable of obtaining a response to the challenge from an MRAM cell array that includes the logical states of the selected MRAM cells of the array. Thus, the response reception circuit 1108 represents at least one example of a means for obtaining a response to the challenge from an MRAM cell array that includes the logical states of the selected MRAM cells of the array.

One or more of the components, steps, features, and/or functions illustrated in FIGS. 3, 4, 5, 6, 7, 8, 9, 10, and/or 11 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 4, 5, 6, 7, 8, 10, and/or 11 may be configured to perform one or more of the methods, features, or steps described in FIGS. 3 and/or 9. The algorithms described herein may also be efficiently implemented in software and/or embedded in hardware.

Moreover, in one aspect of the disclosure, the processing circuit 1004 illustrated in FIGS. 10 and 11 may be a specialized processor (e.g., an application specific integrated circuit (e.g., ASIC)) that is specifically designed and/or hard-wired to perform the algorithms, methods, and/or steps described in FIG. 9. Thus, such a specialized processor (e.g., ASIC) may be one example of a means for executing the algorithms, methods, and/or steps described in FIG. 9. The computer-readable storage medium 1006 may also store processor 1004 readable instructions that when executed by a specialized processor (e.g., ASIC) causes the specialized processor to perform the algorithms, methods, and/or steps described in FIG. 9.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing or containing instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method of implementing a physically unclonable function (PUF), the method comprising:
   initializing an array of magnetoresistive random-access memory (MRAM) cells to a first logical state, each of the MRAM cells having a random transition voltage $V_T$ that is greater than a first voltage $V_1$ and less than a second voltage $V_2$, the transition voltage $V_T$ representing a voltage level that causes the MRAM cells to transition from the first logical state to a second logical state;
   applying a programming signal voltage $V_{PS}$ to each of the MRAM cells of the array to cause at least a portion of the MRAM cells of the array to randomly change state from the first logical state to the second logical state, the programming signal voltage $V_{PS}$ greater than the first voltage $V_1$ and less than the second voltage $V_2$;
   sending a challenge to the array of MRAM cells, the challenge including memory addresses of a plurality of select MRAM cells of the array; and
   receiving a response to the challenge from the array of MRAM cells, the response including data bits stored at the plurality of select MRAM cells.

2. The method of claim 1, wherein the programming signal voltage $V_{PS}$ is about equal to a third voltage $V_3$ that corresponds to a voltage level that causes about half of the MRAM cells to change logical state from the first logical state to the second logical state.

3. The method of claim 1, wherein the logical states of the MRAM cells of the array after the programming signal voltage $V_{PS}$ is applied are stored in secure memory.

4. The method of claim 1, wherein the logical states of the MRAM cells of the array after the programming signal voltage $V_{PS}$ is applied serve as a cryptographic key that uniquely identifies at least one of an electronic device and/or an integrated circuit.

5. The method of claim 1, wherein the second voltage $V_2$ is less than a breakdown voltage of any one of the MRAM cells of the array, the breakdown voltage being that voltage at which a tunneling insulator layer of the MRAM cells breaks down.

6. The method of claim 1, wherein the logical states of the MRAM cells of the array after the programming signal voltage $V_{PS}$ is applied are utilized by a cryptographic security algorithm.

7. An apparatus for implementing a physically unclonable function (PUF), the apparatus comprising:
   an array of magnetoresistive random-access memory (MRAM) cells each having a random transition voltage $V_T$ that is greater than a first voltage $V_1$ and less than a second voltage $V_2$, the transition voltage $V_T$ representing a voltage level that causes the MRAM cells to transition from a first logical state to a second logical state; and
   a processing circuit communicatively coupled to the array, the processing circuit configured to:
      initialize the array of MRAM cells to the first logical state;
      apply a programming signal voltage $V_{PS}$ to each of the MRAM cells of the array to cause at least a portion of the MRAM cells of the array to randomly change state from the first logical state to the second logical state, the programming signal voltage $V_{PS}$ greater than the first voltage $V_1$ and less than the second voltage $V_2$;
      send a challenge to the array of MRAM cells, the challenge including memory addresses of a plurality of select MRAM cells of the array; and
      receive a response to the challenge from the array of MRAM cells, the response including data bits stored at the plurality of select MRAM cells.

8. The apparatus of claim 7, wherein the programming signal voltage $V_{PS}$ is about equal to a third voltage $V_3$ that corresponds to a voltage level that causes about half of the MRAM cells to change logical state from the first logical state to the second logical state.

9. The apparatus of claim 7, further comprising:
   secure memory adapted to store the logical states of the MRAM cells of the array after the programming signal voltage $V_{PS}$ is applied.

10. The apparatus of claim 7, wherein the logical states of the MRAM cells of the array after the programming signal voltage $V_{PS}$ is applied serve as a cryptographic key that uniquely identifies at least one of an electronic device and/or an integrated circuit.

11. The apparatus of claim 7, wherein the second voltage $V_2$ is less than a breakdown voltage of any one of the MRAM cells of the array, the breakdown voltage being that voltage at which a tunneling insulator layer of the MRAM cells breaks down.

12. The apparatus of claim 7, wherein the logical states of the MRAM cells of the array after the programming signal voltage $V_{PS}$ is applied are utilized by a cryptographic security algorithm.

13. An apparatus for implementing a physically unclonable function (PUF), the apparatus comprising:
    means for initializing an array of magnetoresistive random-access memory (MRAM) cells to a first logical state, each of the MRAM cells having a random transition voltage $V_T$ that is greater than a voltage $V_1$ and less than a voltage $V_2$, the transition voltage $V_T$ representing a voltage level that causes the MRAM cells to transition from the first logical state to a second logical state;
    means for applying a programming signal voltage $V_{PS}$ to each of the MRAM cells of the array to cause at least a portion of the MRAM cells of the array to randomly change state from the first logical state to the second logical state, the programming signal voltage $V_{PS}$ greater than the first voltage $V_1$ and less than the second voltage $V_2$;
    means for sending a challenge to the array of MRAM cells, the challenge including memory addresses of a plurality of select MRAM cells of the array; and
    means for receiving a response to the challenge from the array of MRAM cells, the response including data bits stored at the plurality of select MRAM cells.

14. The apparatus of claim 13, wherein the programming signal voltage $V_{PS}$ is about equal to a third voltage level $V_3$ that corresponds to a voltage level that causes about half of the MRAM cells to change logical state from the first logical state to the second logical state.

15. The apparatus of claim 13, wherein the logical states of the MRAM cells of the array after the programming signal voltage $V_{PS}$ is applied serve as a cryptographic key that uniquely identifies at least one of an electronic device and/or an integrated circuit.

16. A computer-readable storage medium having instructions stored thereon for implementing a physically unclonable function (PUF), the instructions, which when executed by at least one processor, causes the processor to:
    initialize an array of magnetoresistive random-access memory (MRAM) cells to a first logical state, each of the MRAM cells having a random transition voltage $V_T$ that is greater than a first voltage $V_1$ and less than a second voltage $V_2$, the transition voltage $V_T$ representing a voltage level that causes the MRAM cells to transition from the first logical state to a second logical state;
    apply a programming signal voltage $V_{PS}$ to each of the MRAM cells of the array to cause at least a portion of the MRAM cells of the array to randomly change state from the first logical state to the second logical state, the programming signal voltage $V_{PS}$ greater than the first voltage $V_1$ and less than the second voltage $V_2$;
    send a challenge to the array of MRAM cells, the challenge including memory addresses of a plurality of select MRAM cells of the array; and
    receive a response to the challenge from the array of MRAM cells, the response including data bits stored at the plurality of select MRAM cells.

17. The computer-readable storage medium of claim 16, wherein the logical states of the MRAM cells of the array after the programming signal voltage $V_{PS}$ is applied serve as a cryptographic key that uniquely identifies at least one of an electronic device and/or an integrated circuit.

* * * * *